March 3, 1964 W. K. FRENCH 3,123,706

ASSOCIATIVE MEMORY

Filed Aug. 10, 1960 2 Sheets-Sheet 1

INVENTOR.
WALTER K. FRENCH

BY

Sughrue, Rothwell, Mion & Zinn
ATTORNEYS

March 3, 1964 | W. K. FRENCH | 3,123,706

ASSOCIATIVE MEMORY

Filed Aug. 10, 1960 | 2 Sheets-Sheet 2

INVENTOR.
WALTER K. FRENCH
BY
Sughrue, Rothwell, Mion & Zinn
ATTORNEYS

United States Patent Office 3,123,706 Patented Mar. 3, 1964

3,123,706

ASSOCIATIVE MEMORY

Walter K. French, Montrose, N.Y., assignor to International Business Machines Corporation, New York, N.Y., a corporation of New York Filed Aug. 10, 1960, Ser. No. 48,696
4 Claims. (Cl. 235—61.11)

This invention relates to an associative memory system and more particularly to a system for reading out of an associative memory a word using some unique portion of this word as an identification tag to locate the word.

In an associative memory, each word is stored therein at an arbitrary or unknown location. When this word is desired, the memory is "addressed" at its input with a tag which is identical to some unique portion of the word. The word may have one or more unique portions any one of which may be used as the tag. A comparison is indicated between the tag of the desired word and the tag at the input to the memory and read-out of the data digits associated with the word is achieved.

It is important to note the difference between a tag memory and an associative memory. The tag memory has the tag portion of the word restricted to a certain part of the word. The tag in this type of memory is not a portion of the word but just an attachment. An associative memory may use any portion of the word as a tag and further a word may be found one time in a given memory using one portion of the word as a tag and the same word located at a later time using a different portion of the word as a tag.

In accordance with the present invention, information is stored in the memory in the form of holes or no-holes in a record such as a punch card. The card is divided into rows and columns in the usual fashion. Each column designates a separate word. The card is operatively associated with X (digit) and Y (word) coordinate electrodes corresponding respectively to the rows and columns of the card. A hole or a no-hole in a card will cause an electrical association between a related X and Y conductor intersection point. By feeding to the desired tag digit lines at the input to the memory an identification tag indicative of a desired word, only that word having the corresponding identification tag associated therewith will produce at the output of the system the data digits contained in the word.

Broadly speaking, there are two embodiments of the present invention. The first may be called the capacitative embodiment and the second the diode embodiment. The capacitative embodiment is further broken down into two species. These species may be identified as the whole species and the no-hole species. In the capacitative embodiment, a capacitative coupling is provided between intersecting points of X and Y conductors determined by the digits in the words. In the diode embodiment, a diode coupling is similarly formed.

The associative memory of this invention has a number of advantages. The word capacity may be quite high per unit volume. The access time is extremely low. Then too, the memory system is easy to construct and maintain and is relatively inexpensive.

It is therefore one object of this invention to provide an associated memory which has a large word capacity per unit volume and in which the words may be stored at arbitrary or unknown locations in the memory.

It is another object of the invention to provide such a memory in which each word is composed of data digits, combinations of which may be selected as tag digits at the beginning of each memory search, and in which a comparison of input tag digits to the memory is made with all of the word tag digits stored in the memory to select a single desired word wherein the data digits associated with said desired word are read out. The comparison results in the setting up of read-out circuitry peculiar to the desired word while inhibiting the read-out circuitry associated with the undesired words.

Another object of the invention is to provide parallel inputs in the form of tag digits to the memory and to perform parallel comparisons with all of the word tags in the memory to select only one of said words and to achieve parallel read-out of the data digits associated with the desired word.

Another object of the invention is to provide a system of the type mentioned above in which punched cards or tapes are used to store the words.

Another object of the invention is to provide a system in which punched cards or tapes are incorporated into a sandwich arrangement with X and Y coordinate electrodes which form discrete electrical couplings between X and Y intersecting points as determined by the punched holes in the cards or tapes and in which an input tag selects a particular word to achieve read-out of the data digits of said word.

These and other objects of the invention will become apparent from a more detailed description of the accompanying drawings.

Figure 1:
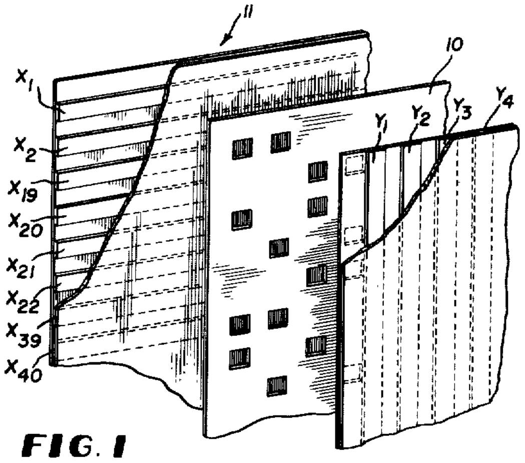
FIGURE 1 is a fragmentary perspective view of one embodiment of the invention.

As shown in FIGURE 1, an information record 10 is made of some electrostatic shielding material properly grounded, for example, a metallized punched card. A simple metallic sheet such as aluminum will function properly. The card is divided into discrete digit areas, each designated by an X and Y coordinate in the usual fashion. Only a portion of the card is shown here, that is, four columns (Y coordinate) and eight rows (X coordinate). There are a plurality of digits shown at positions which may be identified as $X_1$, $Y_1$; $X_1$, $Y_2$, $X_2$, $Y_3$, etc. For illustration purposes the first twenty rows will be chosen as the tag digits and the next twenty rows the data digits, bearing in mind that each column contains a complete word, tag plus data digits. Further, let it be assumed that the identification tag may have ten digits, each of which is a 0 or a 1. The most significant digit of a tag will be punched in either row $X_1$ or $X_2$. If it is a 0, then in the row $X_1$. If it is a 1, then in the row $X_2$. The least significant digit of a tag will be punched in either row $X_{19}$ or row $X_{20}$. As illustrated here, the word in column $Y_1$ has a most significant digit of a 0 and a least significant digit of a 0, that is, a tag of 0 . . . 0. In column $Y_2$ the identification tag is 0 . . . 1. In $Y_3$ the tag is 1 . . . 0. In $Y_4$ the tag is 1 . . . 1. The rows intermediate $X_2$ and $X_{19}$ are not shown. Nor are the rows intermediate rows $X_{22}$ and $X_{39}$. Rows $X_{21}$ through $X_{40}$ contain the data digits of which in this particular example there may be ten such digits per word.

Numeral 11 indicates the X plane of copper conductors and 12 the Y plane of copper conductors. These conductors will be identified in the same manner as the rows and columns since they effectively define the rows and columns. The $X_1$, $X_2$, $X_3$, etc., conductors are positioned in parallel relation between sheets of Mylar and may be bonded into place. They also may of course be partially imbedded in such a plastic. The same general construction is true of the Y plane of conductors. The actual sandwich arrangement is best shown in FIGURE 2.

Figure 2:
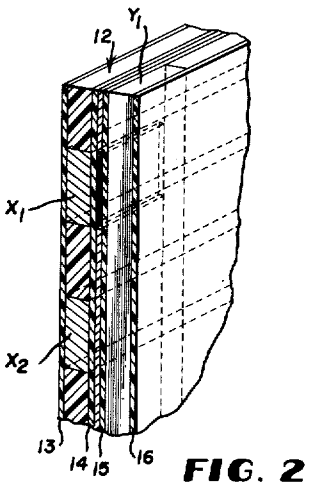
FIGURE 2 is a fragmentary perspective view showing the sandwich arrangement in one embodiment of the invention.

In FIGURE 2, numerals 13, 14, 15, and 16 identify the Mylar sheets. In this figure there is shown a hole in the record card at coordinates $X_1$, $Y_1$.

It can be seen then that only at those intersecting points of X and Y electrodes where a hole occurs is the electrostatic shield absent and, hence, there is provided at said points a capacitance providing capacitative coupling between the coordinate electrodes. The effect of this is shown schematically in FIGURE 3.

Figure 3:
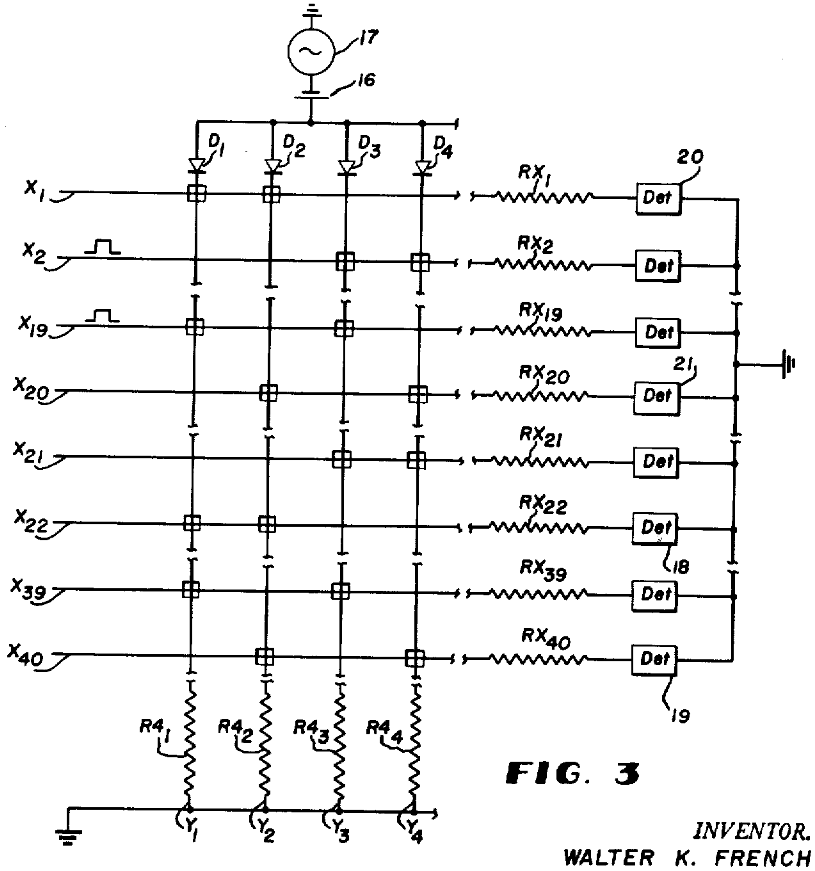
FIGURE 3 is a schematic circuit diagram illustrating the functioning of the system.

Referring to FIGURE 3, a bias battery 16 is poled with relation to the diodes $D_1$, $D_2$, $D_3$, and $D_4$ so as to normally forward bias these diodes. A high frequency generator 17 generates a high frequency signal and through said battery passes this signal to all of the diodes. To selected tag digit lines are applied argument tag digits in the form of positive pulses according to the identification tag of the desired word. For example, if the word having a tag of 0 . . . 1 is desired, pulses are applied to the complementary tag digit lines connected to the X electrodes. In this particular case, positive pulses are applied to tag digit lines $X_2$ and $X_{19}$. It can be seen that the $X_2$ pulse is coupled through the capacitance provided by the $X_2$, $Y_3$ hole to back bias for the duration of the pulse the diode $D_3$ and through the capacitance at $X_2$, $Y_4$ to back bias the diode $D_4$. The $X_{19}$ tag digit line pulse back biases diode $D_1$. This leaves only diode $D_2$ forward biased during pulse time. Consequently, during the time of the application of the pulses to the complementary tag digit lines, the high frequency signal passes through only diode $D_2$ along the conductor $Y_2$ to the data digits in the column formed thereby. At coordinate $X_{22}$, $Y_2$ capacitive coupling feeds a portion of this signal along the $X_{22}$ conductor to the high frequency detector 18, whose input impedance is indicated by the resistance $RX_{22}$. This being a "1" line, the first digit of the data digits associated with the word in column $Y_2$ is a 1. At coordinate $X_{40}$, $Y_2$ capacitative coupling feeds some of the high frequency signal along the $X_{40}$ conductor to the high frequency detector 19 associated with the input impedance $RX_{40}$ to indicate another 1.

It can be seen that only that word having a tag digit corresponding to the tag introduced in a complementary fashion on the tag digit line is read out. Also, the high frequency signal on conductor $Y_2$ is coupled to detectors 20 and 21. This is the true indication of the tag. It can be checked against the input to the tag lines to insure that the data digits obtained are for the correct desired tag. The input impedances to these high frequency detectors are selected so as to offer high impedance to the tag digit line pulses and a low impedance to the high frequency signal. The inputs to all detectors may be gated at pulse time, these gates being normally blocked. The pulse generators (not shown) connected to the tag digit lines offer high impedance to the high frequency signals.

It may be noticed from the similarity of the tag and digit lines in the previous illustration that any of the lines may be chosen as tag digits so long as the desired word has a code in the chosen digits which is different from all of the codes in the same digit positions in all of the other words.

Figures 5, 6, 7:
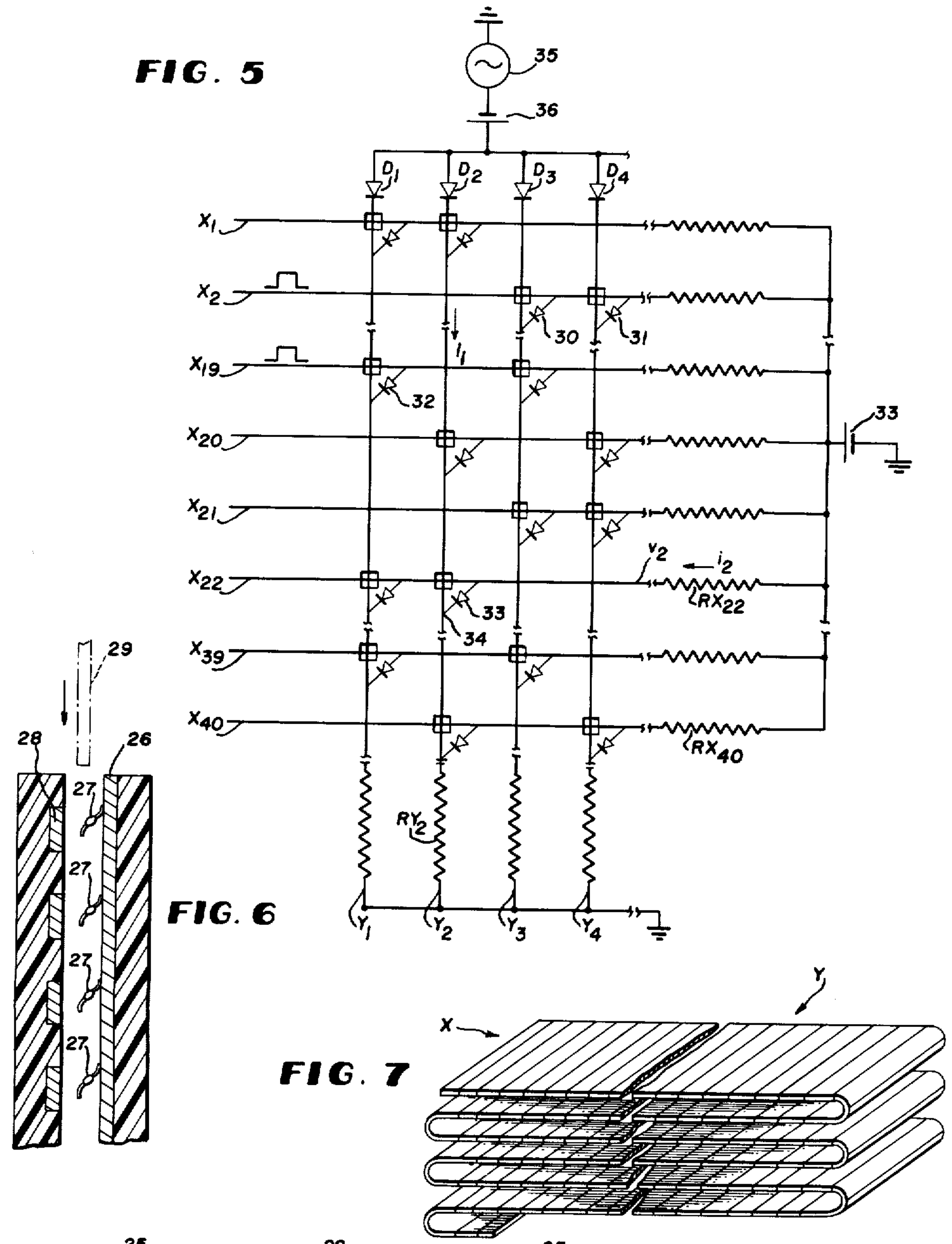
FIGURE 5 is similar to FIGURE 3 but shows another embodiment of the present invention.
FIGURE 6 is a fragmentary cross section of the X and Y plane of conductors as used in conjunction with the embodiment of FIGURE 5.
FIGURE 7 is a perspective view of one means of constructing the associative memory system of the present invention.
Figure 4:
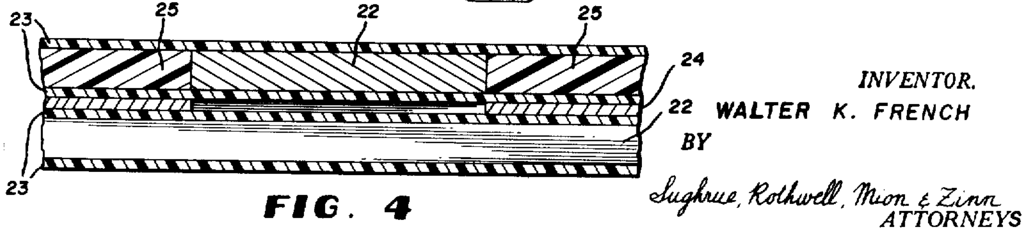
FIGURE 4 is a fragmentary cross section of one embodiment of the sandwich arrangement which may be employed in accordance with this invention.

As previously mentioned, the associated memory of this invention may have an extremely high capacity per unit volume. For instance, 280 X conductors may be used, 200 for tag digits and 80 for information digits. A word will be composed of 140 digit positions, 40 positions for information and 100 positions for the tag. The word capacity depends upon the number of Y conductors. In a specific example illustrating physical compactness with high word capacity, a memory of 31,360 words may be packed into a space of 112 cubic centimeters. As seen particularly in FIGURES 4 and 7, each conductor 22 may be 2 millimeters wide and .1 millimeter thick. The spacing between the conductors may be air or a plastic insulator 25 as particularly shown in FIGURE 4, and this insulation may occupy about 2 millimeters in width. The thickness of the Mylar sheet 23 and the aluminum foil 24 is negligible. The total thickness then may be in the order of .2 millimeter. To form a folded structure as shown in FIGURE 7, each fold is about 1 centimeter thick. 280 X conductors of 112 centimeters in length will occupy 280 (.2 mm.+.2 mm.) or 112 centimeters. 280 Y conductors also occupy 112 centimeters. With 112 folds or 112 times 280 words (31,360 word capacity), the volume occupied by the memory is 112 cubic centimeters.

An alternative species of the capacitative embodiment previously referred to as the no-hole species may also be illustrated by these same figures. Consider that the record card is made of high dielectric material in the order of 1,000, much higher than the dielectric constant of air. Now where there is a hole there is a relatively poor capacitative coupling and where there is no hole there is a relatively good capacitative coupling. The record card contains a no-hole in the proper digit positions of the word. If no hole is present, the capacitance will be greater than about 100 micromicrofarads due to the larger dielectric constant. A hole reduces the capacitance to above 1 micromicrofarad. Complementary tag lines are pulsed positively and all others may be pulsed negatively to effectively reduced the possibility of spurious results.

The diode embodiment is shown in FIGURES 5 and 6. First referring to FIGURE 6, the Y conductor 26 has electrically connected thereto a number of diodes 27. These diodes are normally urged towards the X conductors 28. When the two planes of conductors are in close proximity, separated by the record member 29, only at the X Y coordinate holes therein is a diode connection made between coordinate X and Y conductors. The record member is an insulator. The results are schematically shown in FIGURE 5.

FIGURE 5 functions similarly to the embodiment shown in FIGURE 3. To the complementary tag digits are fed positive pulses comprising the argument tag. Let it be assumed that lines $X_2$ and $X_{19}$ are so pulsed. Due to the hole at $X_2$ $Y_3$, the pulse on the $X_2$ tag line is coupled through diode 30 to back bias diode $D_3$ during pulse time. Due to the hole at $X_2$ $Y_4$ this sample pulse is coupled through diode 31 to back bias diode $D_4$. The hole at $X_2$ $Y_1$ causes diode $D_1$ to be back biased because of the coupling provided by diode 32.

Battery 33, through the high frequency detector input impedance will slightly forward bias all diodes formed at the coordinate intersecting points. For instance, the voltage $V_2$ will forward bias diode 33. The current through the resistor $RY_2=i_1+i_2$ and the voltage at point 34 equals $RY_2(i_1+i_2)$. The voltage at point 34 varies as a function of the A.C. signal generated by the high frequency generator 35. Battery 36 normally forward biases diodes $D_1$ through $D_4$. So it can be seen that the current $i_2$ through the high frequency detector impedance $RX_{22}$ varies as a function of the voltage at point 34. This variation is the signal detected by the associated high frequency detector. In the case at hand, only column $Y_2$ is forward biased during pulse time, the others being reverse based by the argument tag. Therefore, a 1 is detected by the high frequency detector associated with $RX_{22}$ and a 1 is detected by the high frequency detector associated with $RX_{40}$. Only diode $D_2$ remains forward biased during pulse time and therefore the high frequency signal from generator 35 is detected only at the high frequency detectors associated with holes in the $Y_2$ column in the data digit positions.

A photo diode embodiment is also contemplated where the record member functions as a mask between a light source and X and Y coordinate photo diode materials.

While we have shown the tag and digit lines as being consecutive—that is, not intermixed—it is contemplated that they may be designated by any predetermined combination of X lines. The combination may be changed between searches.

What has been shown are various embodiments of the present invention. Other embodiments obvious from the teachings herein to those skilled in the art are contemplated to be within the spirit and scope of the following claims.

What is claimed is:

1. An associative memory system comprising:

(a) a planar record member divided into a plurality of coordinate rows and columns and having holes therein at selected row and column coordinate position, the holes in each column representing words comprised of identifying tag digits and data digits, (b) a plurality of spaced digit electrodes permanently mounted in parallel fashion adjacent one face of the record member, each digit electrode being associated with one of the rows of the record member, (c) a plurality of spaced word electrodes permanently mounted in parallel fashion adjacent the other face of the record member, each word electrode being associated with one of the columns of the record member, thus forming a sandwich construction with the record member serving as the central layer and the digit and word electrodes serving as flanking layers, (d) means including the holes forming electrical connections between the digit and word electrodes at the selected row and column coordinate positions, (e) a source of high frequency signals, (f) a source of D.C. biasing potential connected to the source of high frequency signals, (g) a plurality of diodes individually connected between the source of D.C. biasing potential and each of the word electrodes, said diodes being normally forward biased into a conductive state by the source of D.C. biasing potential to furnish a low impedance path for the high frequency signals, (h) means for applying positive signals to the digit electrodes complementary to the identifying tag digits of a selected word to be read-out, to thereby simultaneously compare the complementary tag digits with the identifying tag digits of each of the words represented by the column holes in the record member, (i) means responsive to a match between the complementary tag digits and the identifying tag digits of the selected word to be read-out for back-biasing the diodes connected to the remainder of the word electrodes into a non-conductive state, to thereby establish a read-out path for the high frequency signals only through the word electrode associated with the selected word, (j) a plurality of output resistances individually connected to each digit electrode and offering high resistance paths to the positive signals applied to the complementary digit electrodes and low resistance paths to the high frequency signals, and (k) a plurality of high frequency detectors, each detector being connected to one of the output resistances, whereby the detectors are responsive to the high frequency signals conducted over the tag and data digit electrodes of the selected word to effect read-out of same.

2. An associatve memory system as defined in claim 1 wherein the record member is formed of an electrostatic shielding material and the holes form a capacitive coupling between the digit and word electrodes at the selected row and column coordinate positions.

3. An associative memory system as defined in claim 1 wherein the record member is formed of a dielectric material.

4. An associative memory system as defined in claim 1 wherein the record member is formed of an insulative material and further including a plurality of diodes, one end of each diode being connected to a coordinate point on each of the word electrodes, and means biasing the other end of each diode toward the digit electrodes, whereby the holes in the record member permit the other end of selected diodes to contact the coordinate digit electrodes and establish selected diode connections between the word and digit electrodes.

References Cited in the file of this patent

UNITED STATES PATENTS

| | | |
|---|---|---|
| 2,873,912 | Vannevar Bush | Feb. 17, 1959 |
| 3,029,020 | Dirks | Apr. 10, 1962 |
| 3,034,101 | Loewe | May 8, 1962 |
| 3,043,505 | Brown | July 10, 1962 |